US008873660B2

(12) United States Patent
Valentine et al.

(10) Patent No.: US 8,873,660 B2
(45) Date of Patent: Oct. 28, 2014

(54) DIVERSITY CONTROL IN A WIRELESS COMMUNICATIONS DEVICE

(75) Inventors: Matthew F. Valentine, Chapel Hill, NC (US); Steve L. Sheya, Lake Villa, IL (US)

(73) Assignee: Motorola Mobility LLC, Chicago, IL (US)

( * ) Notice: Subject to any disclaimer, the term of this patent is extended or adjusted under 35 U.S.C. 154(b) by 138 days.

(21) Appl. No.: 13/034,371

(22) Filed: Feb. 24, 2011

(65) Prior Publication Data

US 2012/0219040 A1   Aug. 30, 2012

(51) Int. Cl.
H04B 7/08 (2006.01)
H04B 7/02 (2006.01)
H04L 1/06 (2006.01)
H04W 52/02 (2009.01)

(52) U.S. Cl.
CPC ............ H04B 7/0871 (2013.01); H04B 7/0877 (2013.01); H04B 7/0825 (2013.01); H04W 52/0245 (2013.01); H04B 7/0814 (2013.01)
USPC ........... 375/267; 375/260; 375/259; 375/347; 375/346; 375/316; 455/277.2; 455/277.1; 455/272; 455/269; 455/130

(58) Field of Classification Search
CPC .. H04B 7/0877; H04B 7/0814; H04B 7/0825; H04W 52/0245
USPC ........ 455/562.1, 277.2, 277.1, 272, 269, 130; 375/267, 260, 259, 347, 346, 316
See application file for complete search history.

(56) References Cited

U.S. PATENT DOCUMENTS

| 5,475,870 | A | * | 12/1995 | Weaver et al. | ............. 455/67.11 |
| 8,031,622 | B2 | * | 10/2011 | Padovani et al. | ............... 370/252 |
| 8,160,648 | B2 | * | 4/2012 | Ulupinar et al. | ........... 455/562.1 |
| 2002/0111158 | A1 | * | 8/2002 | Tee | ............................... 455/421 |
| 2003/0190924 | A1 | | 10/2003 | Agashe et al. | |
| 2004/0253955 | A1 | | 12/2004 | Love et al. | |
| 2007/0049295 | A1 | * | 3/2007 | Soliman et al. | ............ 455/456.3 |
| 2009/0156227 | A1 | | 6/2009 | Frerking et al. | |

FOREIGN PATENT DOCUMENTS

| WO | 0105088 A1 | 1/2001 |
| WO | 2005084379 A2 | 9/2005 |
| WO | 2005088864 A1 | 9/2005 |
| WO | 2009050538 A1 | 4/2009 |

OTHER PUBLICATIONS

Patent Cooperation Treaty, "PCT Search Report and Written Opinion of the International Searching Authority" for International Application No. PCT/US2012/023592, Apr. 25, 2012, 12 pages.

* cited by examiner

Primary Examiner — Chieh M Fan
Assistant Examiner — Michelle M Koeth
(74) Attorney, Agent, or Firm — Faegre Baker Daniels LLP

(57) ABSTRACT

A method and apparatus controls diversity reception in a wireless communication device. By determining a value based on a number of active set pilot signals received from a set of base stations, the wireless communication device dynamically enables or disables diversity reception. Diversity reception can be controlled by adjusting a diversity threshold based on the determined value. A channel quality indicator of a channel is measured and compared against the adjusted diversity threshold. The diversity reception mode is then enabled or disabled based on the comparison. For example, if the number of active pilot signals is above a predetermined value, indicating "good" coverage, the diversity threshold is decreased. The measured channel quality indicator is compared against the adjusted threshold, and diversity reception is enabled when the channel quality indicator is less than the decreased diversity threshold.

17 Claims, 4 Drawing Sheets

DIVERSITY CONTROL IN A WIRELESS COMMUNICATIONS DEVICE

FIELD OF THE DISCLOSURE

The present disclosure relates generally to wireless communications, and more particularly to controlling diversity in wireless communications devices.

BACKGROUND

In diversity receiver architectures, signals received by corresponding receiver antennas are processed simultaneously. In these diversity architectures, additional power is required for down-converting and base-band processing the signal received by each parallel diversity branch. An analysis suggests that the addition of a receive diversity branch in a wireless receiver increases power consumption by 15% or more.

Accordingly, there is an opportunity to control diversity for battery optimization in wireless communications devices. The various aspects, features and advantages of the disclosure will become more fully apparent to those having ordinary skill in the art upon careful consideration of the following Detailed Description thereof with the accompanying drawings described below.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
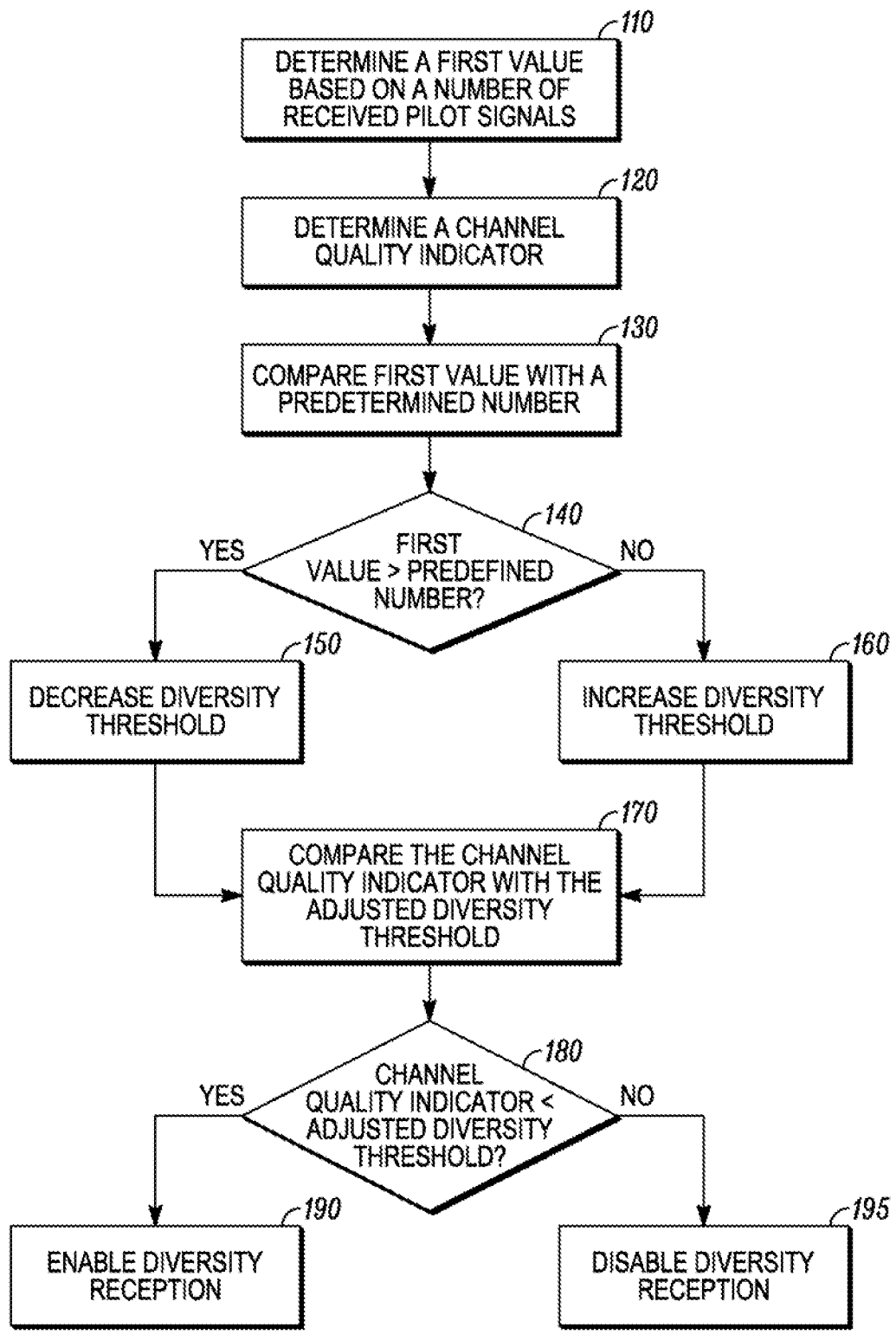
FIG. 1 is a flowchart illustrating a method for controlling diversity reception according to an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments. Also, flowchart boxes may be rearranged into different sequential orders, repeated, or skipped in certain instances.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

Various embodiments disclose controlling diversity reception in a wireless communication device. The wireless communication device dynamically enables or disables diversity reception by adjusting a diversity threshold based on a determined value. The value is determined based on a number of pilot signals received from wireless base stations. As an example, a wireless communication device in a CDMA network supports up to 6 active set pilot signals, and the number of pilot signals in the active set can be used directly as the determined value. The value can then be modified based on the wireless communication device's battery level and/or the available capacity of the network in communication with the device.

Next, a channel quality indicator of a channel is measured and compared against the adjusted diversity threshold. For example, a channel quality indicator indicates a measure of received signal strength (RSSI), average power (Ec/Io), frame error rate (FER), or bit error rate (BER) of a channel. A diversity reception mode is enabled or disabled based on the comparison results.

For example, if the number of active pilot signals is above a predetermined value, indicating "good" network coverage, the diversity threshold is modified. The measured channel quality indicator is compared against the modified threshold, and diversity is enabled when the channel quality indicator meets the increased diversity threshold and diversity is disabled when the channel quality indicator does not meet the increased diversity threshold.

Various embodiments disclose a method for controlling diversity reception in a wireless communication system. A first value based on a number of received pilot signals is determined by a wireless communication device. Network capacity data of the wireless communication system is received from a network element, and the first value is modified based on the received network capacity data. Based on the modified first value, a diversity threshold is adjusted. Diversity reception is then controlled based on the adjusted diversity threshold.

Various embodiments disclose a wireless communication device that maintains a list of pilot signals received from a set of base stations. The wireless communication device determines a value based on a weighted number of pilot signals in the list. The wireless communication device adjusts a diversity threshold based on the determined value and compares a channel quality indicator against the adjusted diversity threshold. Based on the comparison results, the wireless communication device enables or disables diversity reception.

By dynamically enabling and disabling diversity reception based on factors such as pilot signal reception and channel quality (and available battery power and/or available network capacity information) diversity can be disabled when the factors indicate that the wireless communication device will not benefit significantly from diversity reception, which promotes power savings at the wireless communication device. Conversely, diversity can be enabled when the factors indicate that the wireless communication device will benefit significantly from diversity reception, which allows the wireless communication device to report a higher signal quality thus promoting a reduction in the forward power levels of a serving base station.

FIG. 1 is a flowchart illustrating a method for controlling diversity reception in a wireless communication device according to an embodiment. Examples of wireless communication devices include mobile phones (including smartphones), wireless communication-enabled personal digital assistants (PDAs), electronic books (eBooks), wireless communication-enabled laptop computers, wireless communication-enabled game consoles or game controllers, and any other electronic device having the ability to send and/or receive wireless communication information. At step 110, the wireless communication device determines a first value based on a number (count) of pilot signals received from a set of base stations.

Active set pilot signals are the pilot signals associated with the forward traffic channels assigned to the wireless communication device and, in one embodiment, the first value is equal to the number of pilot signals in the active set. According to CDMA standards, a wireless communication device may have between 0-6 pilot signals in its active set. Active pilot signals are received from a set of base stations supporting traffic channels to the wireless communication device. Note that the active set does not include candidate set pilot signals or neighbor set pilot signals. The candidate set contains pilots that are not currently in the active set but have sufficient strength to indicate that the associated forward traffic channels could be successfully demodulated. The neighbor set contains pilots that are not currently in the active set but are likely candidates for handoff. In a more generic embodiment, the first value is based on the active set count and/or a candidate set count and/or a neighbor set count. These three set counts could be weighted using fractions (e.g., 1.1×active_set_count+0.25×candidate_set_count+0.10× neighbor_set_count) or another type of equation.

The wireless communication device also determines 120 a channel quality indicator (CQI) of the active channels. The channel quality indicator is a value representing a measure of the communication quality of a wireless channel. A CQI for a channel can be computed by making use of performance metrics, such as a signal-to-noise ratio (SNR), signal-to-interference plus noise ratio (SINR), signal-to-noise plus distortion ratio (SNDR), a ratio of energy per chip to interference power spectral density (Ec/Io) for a CDMA target system and/or just Signal Strength for non-CDMA target systems. Another common measurement of channel quality is a received signal strength indicator (RSSI). For these particular CQI measurements, a higher value indicates a higher quality channel. Other CQI measurements, however, such as bit error rate (BER) or frame error rate (FER) can be used, where a higher BER/FER value indicates a lower quality channel.

At step 130, the wireless communication device compares the first value with a predetermined number. As mentioned previously, the first value is a numerical quantity representing a count of pilot signals. In an example, the predefined number is used as a threshold for determining the type of coverage offered by the communication system. Based on the comparison, a diversity threshold is adjusted at step 140. If it is determined 140 that the first value is greater than the predefined number, the diversity threshold is decreased 150. On the other hand, if it is determined that the first value is less than the predefined number, the diversity threshold is increased 160. After the diversity threshold is increased or decreased at step 150 or 160, the channel quality indicator (which was determined at step 120) is compared 170 with the adjusted diversity threshold. At step 180, if the channel quality indicator is less than the adjusted diversity threshold, then the diversity reception mode is enabled 190. Otherwise, if the channel quality indicator is greater than the adjusted diversity threshold, then diversity reception is disabled 195. Note that this assumes a direct proportional relationship between a CQI value and the quality of that channel. If there is an inverse proportional relationship between a CQI value and the quality of that channel (e.g., BER/FER measurements), the comparison 180 is adjusted accordingly in order to enable diversity reception when the CQI suggests that the mobile device can benefit from diversity.

Using this methodology, a wireless communication device in an environment with a high number of active set pilot signals adjusts its diversity threshold by decreasing it. As long as the channel quality indicator does not suggest that the mobile device can significantly benefit from diversity when compared to the adjusted diversity threshold, the wireless communication device disables diversity reception. This promotes power savings at the wireless communication device. If, however, the wireless communication device is in an environment with a low number of active set pilot signals, the wireless communication device adjusts its diversity threshold by increasing it. If the channel quality indicator suggests that the mobile device can significantly benefit from diversity when compared with the adjusted diversity threshold, the wireless communication device enables diversity reception. Although diversity reception increases power usage at the mobile station, diversity reception allows the wireless communication device to report a higher signal quality thus reducing the forward power levels of a serving base station. Note that hysteresis should be implemented to prevent diversity reception from suddenly changing the channel quality indicator (or pilot signal sets) and improperly causing diversity to turn off right after it has been turned on and vice versa.

In an embodiment, the first value is classified into one or more coverage modes and diversity reception is controlled based on the current coverage mode. In the embodiment below, the first value is classified into one of three possible coverage modes: excellent coverage mode, medium coverage mode, or fringe coverage mode as shown in an example under Function Table 1.

FUNCTION TABLE 1

| Coverage mode | # of active pilot signals (first value) | Adjustment Factor (dB) (second value) |
| --- | --- | --- |
| Excellent | 3+ | −2 |
| Medium | 2 | +4 |
| Fringe | 0-1 | +8 |

The first value represents an "excellent" coverage mode when the first value is within a first range (e.g., 3+). The first value represents a "medium" coverage mode when the first value is within a second range (e.g., 2). The first value represents a "fringe" coverage mode when the first value is within a third range (e.g., 0-1). Of course, alternate implementations may use different ranges of first values to represent different types of coverage modes. Additionally, the number of coverage modes may be different in other implementations.

In an embodiment, the nominal diversity threshold is adjusted by a factor (second value) called an adjustment factor. The adjustment factor is calculated for each coverage mode based on a pre-defined function. The pre-defined function depends on the first value as shown in Function Table 1. In an example, the pre-defined function is determined based on higher granularity equations involving the count of active set pilot signals received by the wireless device. In another example, the pre-defined function is determined based on a direct mapping of first value to a range of diversity thresholds. In yet another example, the pre-defined function is determined based on predictive changes. The predictive changes can be based on a history of active pilot signal measurements within a communication area. Such historical data may include an identification of the serving system and the identification of the most likely target system for handoff, a history of handoffs, and information related to past active pilot measurements, collected during previous operation of the wireless device.

Based on the calculated adjustment factor, the wireless device adjusts the diversity threshold for controlling diversity reception by either increasing or decreasing the diversity threshold. In an example, the diversity threshold is expressed in decibels (dB) and the channel quality indicator is also expressed in dB. The wireless device decreases the diversity threshold by the corresponding adjustment factor when the first value is above or within the first range. The measured channel quality indicator is compared with the adjusted threshold to enable diversity reception from a default disabled mode. Conceptually, decreasing the diversity threshold results in delayed switching to diversity reception mode. In other words, the wireless device remains in the default "disable diversity reception" mode until the channel quality indicator decreases below the adjusted (decreased) diversity threshold. Note that this assumes that the default is to disable diversity reception. If the default was to enable diversity reception, the same channel quality measurements may result in an initial turning-off of diversity reception mode.

Conversely, the diversity threshold is increased by the corresponding adjustment factor when the first value is within the second range. Conceptually, increasing the diversity threshold would expedite enabling the diversity reception mode. In other words, the mobile station switches to the diversity reception mode as soon as the channel quality indicator crosses below the adjusted (increased) diversity threshold.

The adjusted diversity threshold is determined as,

AdjTh=DivTh+f(first value)

Where,

AdjTh is the adjusted threshold,

DivTh is the diversity threshold (nominal), and f(first value) is the adjustment factor as a function of the number of active set pilot signals.

In an example, for a nominal diversity threshold of −18 dB, when the first value of number of active pilot signals indicates "excellent" coverage mode, then according to Function Table 1, the diversity threshold is adjusted by an adjustment factor of −2 dB (i.e., the diversity threshold is decreased by 2 dB). A diversity reception mode is enabled when the channel quality indicator meets or crosses the adjusted diversity threshold of −20 dB (−18 dB−2 dB). The higher the number of active set pilot signals, the more overlapping sectors there are. More overlapping sectors provide better network coverage. Thus, a switching of the diversity reception from a disabled mode to an enabled mode is delayed to occur when the channel quality indicator is below −20 dB instead of below −18 dB, which promotes power savings at the wireless communication device. On the other hand, when the first value indicates "fringe" coverage mode, then according to Function Table 1, the diversity threshold is adjusted by an adjustment factor of +8 dB (i.e., the diversity threshold is increased by 8 dB). A diversity reception mode is enabled when the channel quality indicator meets or crosses the adjusted diversity threshold of −10 dB (−18 dB+8 dB). Thus, a switching of the diversity reception from a disabled mode to an enabled mode is expedited to occur when the channel quality indicator is below −10 dB instead of below the nominal diversity threshold of −18 dB.

As shown in Function Table 1, there can be more than two coverage modes and thus more than two types of adjustments to the nominal diversity threshold. Of course, there can also be exactly two coverage modes. Additionally, some ranges of the first value may make no changes to the nominal diversity threshold. Note also, that variations of Function Table 1 may use different adjustment factors (different values and/or different units of measurement) and different nominal diversity threshold values (and/or different units of measurement). For example, for CQI measurements based on BER/FER, the nominal diversity threshold and adjustment factors would have both different values and different units of measurement.

Figure 2:
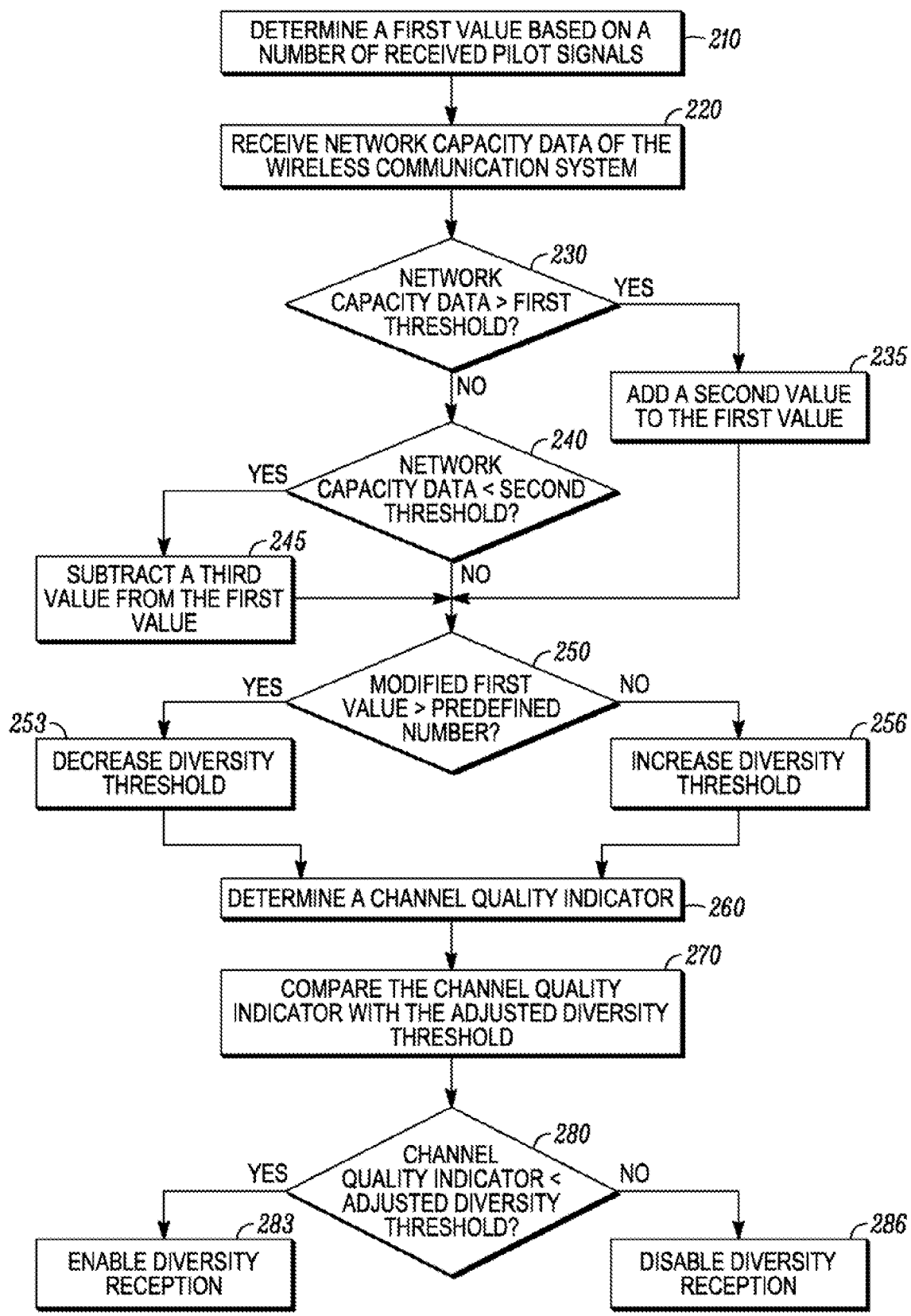
FIG. 2 is a flowchart illustrating a method for controlling diversity reception according to another embodiment.

FIG. 2 is a flowchart illustrating a method for controlling diversity reception according to another embodiment. At step 210, the wireless communication device determines a first value based on a count of pilot signals, which could include active set, candidate set, and/or neighbor set pilot signals potentially with weighting factors. The wireless communication device receives 220 network capacity data from a network element such as a base station in the wireless communication network. Network capacity can be expressed in a variety of ways including Mbps available, loading percentage, number of mobile stations using the current sector, Erlangs, etc. The network capacity data indicates available network capacity as communicated by the network to the wireless communication device. (We shall assume a direct proportional relationship between a network capacity value and available capacity in the network. If the network capacity value has an inverse relationship to the available capacity in the network, the value can be inverted or the upcoming comparisons can be reversed.)

At step 230, the network capacity data is compared against a first predetermined threshold. Upon comparison, if the network capacity data is greater than the predetermined first threshold, a second value is added 235 to the first value. On the other hand, if the network capacity data is less than a second threshold at step 240, a third value is subtracted 245 from the first value. Additional thresholds can be provided in order to further categorize the available network capacity based on the network capacity data, or the number of thresholds can be reduced to one to support two categories. After the first value is modified based on the network capacity data, it is compared 250 with a predefined value as given in Function Table 1. At step 250, if it is determined that the modified first value is greater than the predefined number, the diversity threshold is decreased 253. On the other hand, if it is determined that the modified first value is less than the predefined number, the diversity threshold is increased 256.

At step 260, the wireless communication device determines a channel quality indicator and compares 270 the channel quality indicator value with the adjusted diversity threshold. If it is determined 280 that the channel quality indicator is less than the adjusted diversity threshold, then the diversity reception mode is enabled 283. If the channel quality indicator is greater than the adjusted diversity threshold, diversity reception mode is disabled 286. As discussed earlier with reference to FIG. 1, the channel quality indicator is a value representing a measure of the communication quality of a wireless channel assigned to the wireless communication device. If the CQI value is inversely related to the channel quality, the implementation of the comparison 280 in the flowchart of FIG. 2 should be adjusted accordingly to maintain a method that disables diversity when the channel quality indicator suggests that the mobile device will not significantly benefit from diversity when compared with the adjusted diversity threshold and enables diversity when the channel quality indicator suggests that the mobile device will significantly benefit from diversity when compared with the adjusted diversity threshold.

In an embodiment, the wireless communication device receives network capacity data of the wireless communication system from the network element and categorizes the network capacity data into one of a plurality of network capacity bands, as shown in an example under Function Table 2.

FUNCTION TABLE 2

| Network capacity bands | Network capacity (Mbps) | Modification Factor |
|---|---|---|
| Good | >3.6 | 1 |
| Fair | 1.1 to 3.6 | −1 |
| Poor | 0.5 to 1.2 | −2 |
| No Service | <0.4 | −3 |

The network capacity data is categorized to be in a "good" network capacity band when the network capacity data indicates that currently-available network capacity is greater than a first threshold (e.g., >3.6 Mbps). The network capacity data is categorized to be in a "no service" network capacity band, when the network capacity data indicates that the currently-available network capacity is less than a second threshold (e.g., <0.4 Mbps). The network capacity data is categorized to be in a "fair" network capacity band, when the currently-available network capacity is less than the first threshold and greater than a third threshold (e.g., 1.1 to 3.6 Mbps). The network capacity data is categorized to be in a "poor" network capacity band, when the currently-available network capacity is less than the third threshold and greater than the second threshold (e.g., 0.5 to 1.2 Mbps). Additional thresholds can be provided to enable further granularity for bands of network capacity and fewer thresholds can be provided if less granularity is desired. A minimum of one threshold is needed to implement two network capacity bands.

In an embodiment, the value based on the count of active set pilot signals (i.e., the first value) is adjusted by a factor called a modification factor. The modification factor is determined for each network capacity band based on a pre-defined function. The pre-defined function depends on the network capacity data as shown in Function Table 2. In an example, the pre-defined function is determined based on higher granularity equations involving network capacity measurements of the wireless communication system. In another example, the pre-defined function is determined based on a direct mapping of network capacity data of the communication system to a range of active pilot signal counts. In another example, the pre-defined function is determined based on predictive changes. The predictive changes can be based on a history of network capacity measurements collected during prior operation of the wireless device as described earlier.

Based on the calculated modification factor, the wireless communication device modifies the active set pilot signal count by either increasing or decreasing the active set pilot signal count. Note that the modification factor can also be zero. In an example, the wireless communication device increases the active set pilot signal count when the network capacity data is above a predetermined value. Conversely, the active set pilot signal count is decreased when the network capacity data is below a predetermined value (which could be a second predetermined value or the same predetermined value).

In another embodiment, the method includes detecting remaining battery capacity in the wireless communication device. When the battery capacity in the wireless communication device reaches or goes below a threshold, the wireless device can disable diversity reception in order to reduce further battery drain. For example, when only 5% of battery capacity is left, the wireless device can adjust its diversity threshold in order to discourage diversity reception. In more detail, the active set pilot signal count (first value) is modified based on the level of remaining battery capacity. For example, the first value is modified by adding a second value when the remaining battery capacity is less than a threshold. Using the modified first value, the diversity reception is controlled by a process similar to the process flow shown in steps 250-286 of FIG. 2 (or steps 140-195 of FIG. 1), where a nominal diversity threshold is adjusted based on the modified first value. A channel quality indicator is then compared with the adjusted diversity threshold, and diversity reception is enabled or disabled based on the comparison. When the battery capacity is above a certain predetermined level, the process follows the steps similar to FIGS. 1 and 2 without any additional modifications to the first value.

Thus, several different examples show how the first value can be used (directly or with modification based on remaining battery capacity or network capacity) to adjust a nominal diversity threshold. Then, a channel quality indicator is compared with the adjusted diversity threshold to control whether diversity in a wireless communication device should be turned on or turned off. The first value is primarily based on the number of pilot signals in an active set of the wireless communication device. Additional or alternate factors may be used to modify the first value. Also, the first value may be modified by fractional values instead of only whole numbers. The modified (or unmodified) first value is used to adjust a nominal diversity threshold. Although the adjustments described are table-based, other methods of adjustment are equally feasible—such as using equations for a continuously adaptive adjustment.

Figure 3:
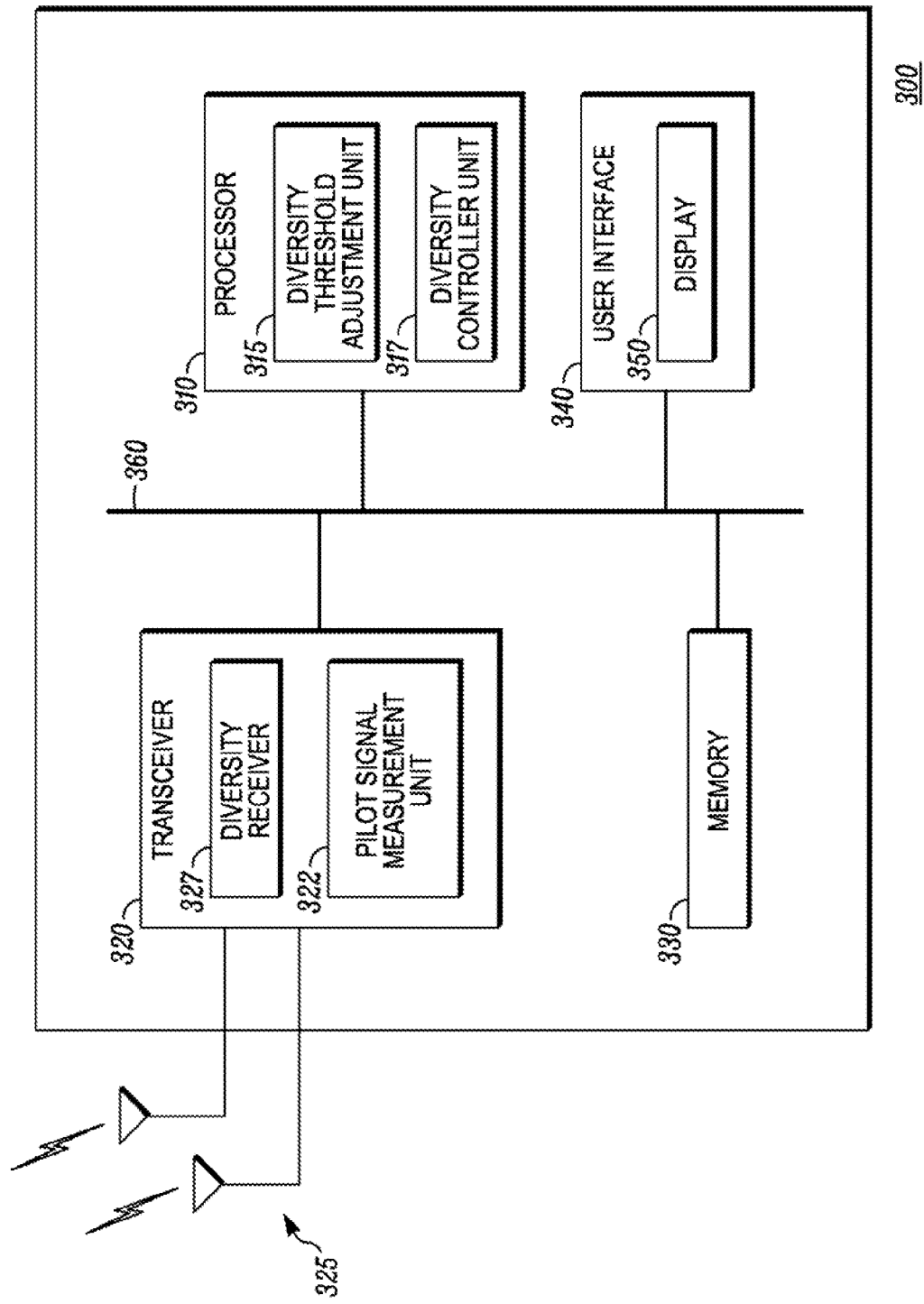
FIG. 3 is a schematic block diagram of an exemplary diversity communications device.

FIG. 3 is a schematic block diagram of an exemplary diversity communications device 300. The wireless communication device 300 includes a processor 310, a transceiver 320 including a diversity receiver 327 with at least two branches, a memory 330, a user interface 340 with a display 350, and a diversity antenna system 325. All these components are communicatively coupled to each other over a bidirectional system bus 360. The processor 310 includes a diversity threshold adjustment unit 315. The transceiver 320 includes a pilot signal measurement unit 322 for receiving and maintaining a list of active set pilot signals from a set of base stations with which the wireless communication device 300 is simultaneously actively connected. Further, the processor 310 includes a diversity controller unit 317 that dynamically enables and disables diversity reception at the diversity receiver 327.

The user interface 340, 350 directs user input data to the processor 310 and represents input and output components for interfacing with a user of the wireless communication device 300. The memory 330 may store software programs or the like used for the processing and the controlling of operations performed by the processor 310, or may temporarily store data that have been inputted or which are to be outputted. The memory 330 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like.

The transceiver unit 320 can be implemented as a transmitting and receiving component of the wireless communication device 300. In an embodiment, some functions of the transceiver 320 can be implemented in the processor 310. The diversity receiver 327 receives signals from the base stations via the antenna system 325 and measures signal strengths of received pilot signals to generate a list of active set pilot signals, candidate set pilot signals, and neighbor set pilot signals. Further, the transceiver 320 receives signals from the serving base station via the antenna system 325 and measures a channel quality of a channel assigned to the wireless communication device 300 to calculate a channel quality indicator (CQI). The CQI of the communication system is, for example, measured as a ratio of energy per chip to interference power spectral density (Ec/Io) for a CDMA target system, a Signal to Noise Ratio (SNR) or, in some systems, just Signal Strength for non-CDMA systems. Alternately, CQI measurements, which are inversely related to channel quality, include bit error rate (BER) and frame error rate (FER).

The processor 310 (such as a microprocessor or the like) typically controls the general operations of the wireless communication device 300. For example, the processor 310 performs controlling and processing associated with computation, communication, transaction, and the like. Using the list of active pilot signals stored in the memory 330, the processor 310 calculates an adjustment factor based on a pre-defined function. The pre-defined function depends on a first value defined by the count of active pilot signals, as shown in Function Table 1. The diversity threshold adjustment unit 315 in the processor 310 adjusts a nominal diversity threshold based on the adjustment factor. The nominal diversity threshold is a predetermined value stored in memory 330. The nominal diversity threshold is a known value, e.g., industry standard, hard-coded number etc. The transceiver 320 periodically measures the channel quality of the communication system, and the processor 310 coupled to the transceiver 320 activates a diversity reception mode when the CQI exceeds the adjusted diversity threshold.

Figure 4:
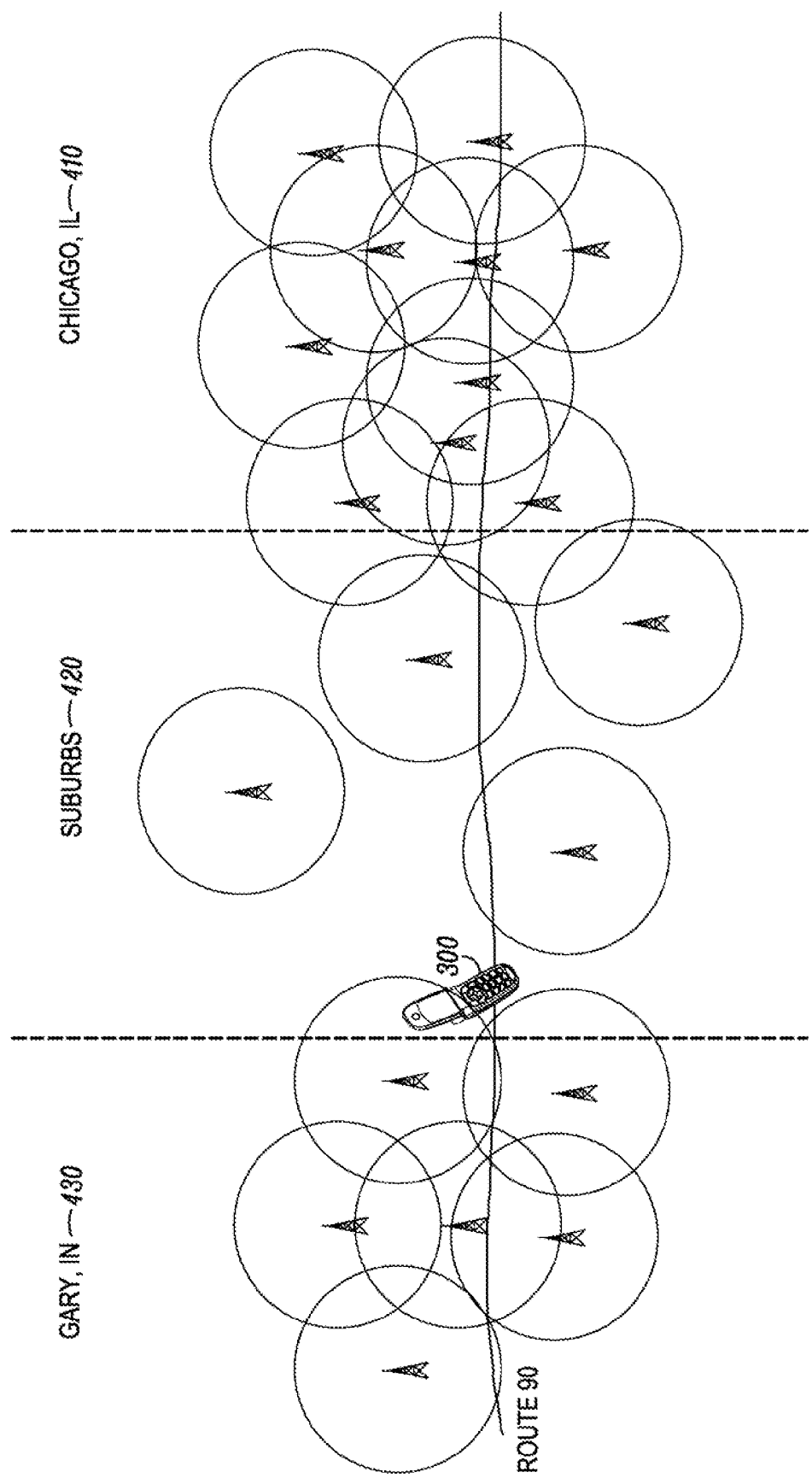
FIG. 4 is an exemplary system diagram illustrating various coverage modes.

FIG. 4 illustrates a scenario when the diversity reception in a wireless communication device 300 is dynamically controlled according to varying network coverage situations. In an example, a wireless communication device 300 is en route a highway and periodically measures the signals strengths of pilot signals received from base stations within communication range. The device 300 creates and maintains an Active Set, which is a set of base stations and corresponding pilot signals with a forward traffic channel assigned to the wireless device 300. Initially, the Active Set must have at least one base station and one pilot signal, and other pilot signals (from the same base station or another base station) can be added.

Returning to the example shown in FIG. 4, the wireless communication device 300 moves from Chicago, Ill. 410 to Gary, Ind. 430 through some suburbs 420 via Route 90. While the device 300 moves through Chicago, the active set has at least three active pilot signals (i.e., the device 300 is communicating with at least three base station segments over at least three traffic channels). According to the embodiment discussed under FIG. 1 with reference to Function Table 1, the wireless device 300 is in "Excellent" coverage mode when the number of active set pilot signals is in the range 3+. Further, as shown in Function Table 1, the calculated adjustment factor is "−2" for Excellent coverage mode. A nominal diversity threshold, say −18 dB is then adjusted by the adjustment factor "−2" resulting in a decreased diversity threshold of −20 dB. Because the nominal diversity threshold for enabling diversity reception is −18 dB, and given a measured CQI value of −19 dB, in a non-adjusted situation, diversity reception would be enabled. However, since the adjusted diversity threshold is −20 dB due to excellent network coverage conditions, the measured CQI of −19 dB is greater than the adjusted diversity threshold of −20 dB and diversity reception is disabled. This is because, the coverage (overlapping sectors shown as circles) offered by the network at that point in time and location is excellent and diversity reception should be unnecessary. This promotes battery savings as long as the CQI does not meet the adjusted diversity threshold.

As the wireless communication device 300 moves along route 90 and enters the suburbs 420, the count of pilot signals in the active set might decrease. This is because, the pilot signals in the active set are still continuously measured and at any instant if any of the signal strengths drop below the drop threshold for a predetermined time, the pilot signal is removed from the active set. As can be seen from the figure, there are very few overlapping sectors in the suburbs, and therefore the number of pilot signals in the list might be less than it was in Chicago, for example the wireless communication device's active set may contain only 1 pilot signal most of the time while traveling in the suburbs 420. Again referring to Function Table 1, when the number of active pilot signals is in the range 0-1, the coverage is classified as "Fringe" coverage mode. For Fringe coverage mode, the calculated adjustment factor is "+8." The nominal diversity threshold of −18 dB is adjusted by the adjustment factor "+8" resulting in an increased diversity threshold of −10 dB. Given a measured CQI value of −12 dB, diversity reception is enabled because the measured CQI value is less than the adjusted diversity threshold. This is because, the coverage (overlapping sectors shown as circles) offered by the network at that point in time and location is poor, and diversity reception is expected to improve reception at the wireless communication device. If the wireless communication device reports improved reception to the network, the transmission power from the serving base station to the wireless communication device can be reduced, which may increase overall network capacity.

As shown in FIG. 4, as the wireless communication device 300 moves towards Gary, Ind. 430 from the suburbs 420, the device 300 begins to see additional pilot signals whose signal strengths exceed the add threshold. The wireless communication device 300 may then add some of those pilot signals to the active set. As shown in the figure, the number of overlapping sectors is more than that was in the suburbs and less than that was in Chicago. For example, when the number of active pilot signals is 2, the coverage is classified as "Medium" coverage mode. For Medium coverage mode, the calculated adjustment factor is "+4." The nominal diversity threshold of −18 dB is adjusted by the adjustment factor "+4" resulting in an increased diversity threshold of −14 dB. Since a measured CQI value of −16 dB is below the currently adjusted diversity threshold of −14 dB, diversity reception remains enabled. This is because, the coverage (overlapping sectors shown as circles) offered by the network at that point of time and location might not be sufficient and diversity reception is beneficial to receiving signals. If the measured CQI value increased above the current adjusted diversity threshold at a certain location and time, diversity would then be disabled. Because the enablement and disablement of diversity may affect the count of active set pilot signals and the CQI measurement, hysteresis should be implemented to avoid fast-switching between diversity-on and diversity-off.

In the foregoing specification, specific embodiments have been described. However, one of ordinary skill in the art appreciates that various modifications and changes can be made without departing from the scope of the invention as set forth in the claims below. For example, although CDMA systems have been described in detail, teachings from this specification may be applied to TDMA/GSM systems, OFDMA systems, and other wireless access technologies. Also, although wide area networks have been implied, teachings from this specification may be applied to local area networks and personal area networks. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method in a wireless communication device having diversity reception comprising:

determining, by the wireless communication device, a number of pilot signals received from a set of base stations supporting traffic channels to the wireless communication device;

determining, by the wireless communication device, a channel quality indicator;

increasing, by the wireless communication device, a diversity threshold, by adding a pre-determined adjustment factor to the diversity threshold, when the number of pilot signals is below a predetermined number, the adjustment factor being pre-calculated for each of a plurality of coverage modes based on a pre-defined function;

enabling, by the wireless communication device, the diversity reception when the channel quality indicator is less than the increased diversity threshold that results from the number of pilot signals decreasing below the predetermined number; and disabling diversity reception when the channel quality indicator exceeds the increased diversity threshold.

2. The method of claim 1, wherein the determining a channel quality indicator comprises:

measuring at least one of: received signal strength indicator (RSSI), average power (Ec/Io), frame error rate (FER), or bit error rate (BER) of a channel assigned to the wireless communication device.

3. The method of claim 1, further comprising:

decreasing the diversity threshold when the number of pilot signals is above the predetermined number.

4. The method of claim 1, further comprising:

determining, by the wireless communication device, a first value based on the number of pilot signals; and setting the first value to equal the number of pilot signals supporting traffic channels to the wireless communication device.

5. The method of claim 4 further comprising:

classifying the first value into at least one coverage mode; and enabling diversity reception based on the at least one coverage mode.

6. The method of claim 5, wherein classifying the first value into at least one coverage mode comprises:

classifying the first value as one of an excellent coverage mode, a medium coverage mode, or a fringe coverage mode.

7. The method of claim 1 further comprising:
    detecting remaining battery capacity;
    modifying the first value based on the remaining battery capacity;
    adjusting the diversity threshold based on the modified first value;
    comparing the channel quality indicator with the adjusted diversity threshold; and
    controlling diversity reception based on the comparison.
8. The method of claim 7, wherein modifying the first value comprises:
    adding a second value to the first value when the remaining battery capacity is less than a threshold.
9. A method in a wireless communication system, the method comprising:
    determining, by a wireless communication device, a first value based on a number of pilot signals received from a set of base stations supporting traffic channels to the wireless communication device;
    receiving, from a network element, network capacity data of the wireless communication system;
    modifying, by the wireless communication device, the first value by adding a modification factor, wherein the modification factor is pre-determined for each of a plurality of network capacity bands based on a pre-defined function relating a range of the network capacity data respectively to each network capacity band;
    adjusting a diversity threshold based on the modified first value; and
    controlling diversity reception based on the adjusted diversity threshold.
10. The method of claim 9, wherein modifying the first value comprises:
    adding a second value to the first value when the network capacity data exceeds a first threshold.
11. The method of claim 9, wherein modifying the first value comprises:
    subtracting a third value from the first value when the network capacity data is below a second threshold.
12. The method of claim 9, wherein adjusting a diversity threshold comprises:
    decreasing the diversity threshold when the modified first value is below a predefined number.
13. The method of claim 9, wherein adjusting a diversity threshold comprises:
    increasing the diversity threshold when the modified first value is above a predefined number.
14. The method of claim 9, wherein controlling diversity reception comprises:
    determining, by the wireless communication device, a channel quality indicator;
    comparing the channel quality indicator with the adjusted diversity threshold; and
    disabling diversity reception when the channel quality indicator exceeds the adjusted diversity threshold.
15. The method of claim 14 further comprising:
    enabling diversity reception when the channel quality indicator is less than the adjusted diversity threshold.
16. A wireless communication device comprising:
    a transceiver for maintaining a list of pilot signals received from a set of base stations supporting traffic channels to the wireless communication device;
    a diversity receiver;
    a memory for storing the list of pilot signals; and
    a processor for:
        determining a number of pilot signals in the list,
        determining a channel quality indicator,
        increasing a diversity threshold, by adding a pre-determined adjustment factor to the diversity threshold, when the number of pilot signals is below a predetermined number, the adjustment factor being pre-calculated for each of a plurality of coverage modes based on a pre-defined function;
        enabling the diversity receiver when the channel quality indicator is less than the increased diversity threshold that results from the number of pilot signals decreasing below the predetermined threshold, and
        disabling diversity reception when the channel quality indicator exceeds the increased diversity threshold.
17. The method of claim 1, wherein the predetermined number identifies a threshold for the number of pilot signals received by the wireless communication device.

* * * * *